(No Model.)

J. W. WOLCOTT.
KITCHEN TABLE.

No. 263,275. Patented Aug. 22, 1882.

Witnesses:
Clinton French
G. W. Cromwell

Inventor:
John W. Wolcott
By Geo. W. Tibbitts Atty

UNITED STATES PATENT OFFICE.

JOHN W. WOLCOTT, OF CLYDE, OHIO.

KITCHEN-TABLE.

SPECIFICATION forming part of Letters Patent No. 263,275, dated August 22, 1882.

Application filed February 8, 1881. (No model.)

*To all whom it may concern:*

Be it known that I, JOHN W. WOLCOTT, of Clyde, in the county of Sandusky and State of Ohio, have invented a new and useful Kitchen-Table Cabinet, of which the following is a full, clear, and exact description, reference being had to the drawings hereto annexed, in which—

Figure 2:
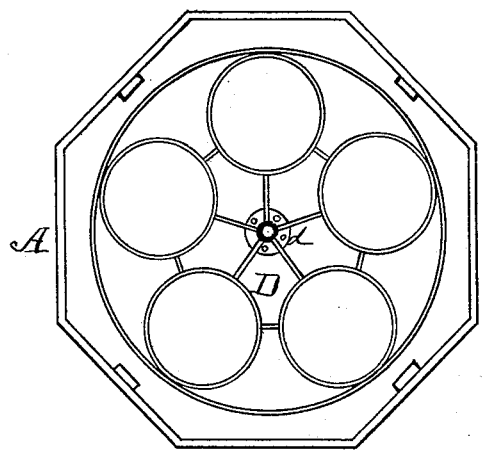
Figure 1:
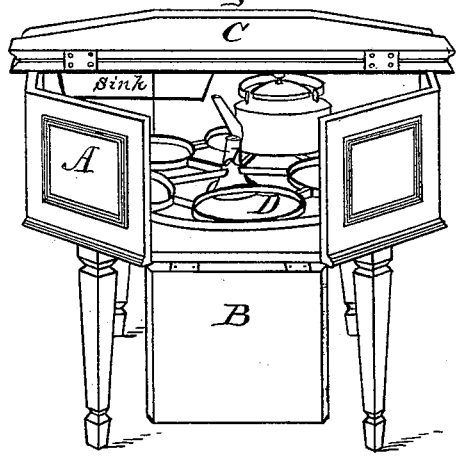

Figure 1 is a perspective view of a table, showing my improvement; and Fig. 2, a plan view with the top of the table removed to show the interior arrangement.

The object of my invention is to provide a table which may be used as a cabinet for receiving cooking utensils when it is desired to store away the latter; and it consists in a certain arrangement of parts, as hereinafter described.

The inconvenience and annoyance of having pots, kettles, and other cooking utensils arranged upon the tops of tables or shelves, where the soot is liable to be deposited, is well known to all house-keepers. It is a question of considerable importance to such, therefore, as to what disposition shall be made of these vessels when not in use. The stove will not ordinarily hold more than half the entire set. Besides, they would be burned out much sooner by being kept constantly upon a heated stove. This inconvenience is felt still more sensibly by families whose dwellings contain but one or two rooms, as is frequently the case in newly-settled districts, where building materials are scarce, and among the poor in over-crowded cities.

To meet the want of a convenient and suitable receptacle for cooking utensils, I construct a combined table and cabinet in the following manner:

A table, A, of any desired form, is provided with a deep chamber under its lid, a portion, C, of which is hinged in the usual manner to give more convenient access to said chamber. One side of the chamber also may be provided with a drop-door, B. In the bottom of said chamber is a central upright pintle of sufficient height to support in a horizontal position the rack D, whose central hub, $d$, rotates thereon. This rack D is preferably made of metal; and it consists of a large ring, to the inner surface of which are secured five or more smaller rings, which are connected with each other and with the central hub, $d$, by means of suitable stays. These rings may be made of different sizes, if desired, and numerous enough to occupy all available space.

By making the rack of metal, pots and kettles may be placed upon it when taken directly from over the fire, and by using rings connected together by stays the rack is made not only strong, but comparatively inexpensive.

By rotating the rack in the manner of a self-waiting table, utensils may be conveniently placed thereon or taken off for use. When desired, also, the rack may be taken out by lifting it from the pintle for the purpose of scouring it, or for using the chamber temporarily for any other purpose to which it may be adapted, as for packing articles or utensils in case of removal from one place to another.

It will be seen that this cabinet takes up no more room in a house than an ordinary table, while it displaces the ordinary table, in that it is itself a table capable of all the uses to which a table can be put.

I am aware that kitchen-cabinets of various constructions have before been used. I wish it distinctly understood, also, that I do not broadly claim a chambered table, such being shown in the ordinary self-waiting table; but

What I claim as new, and desire to secure by Letters Patent, is—

1. In combination with the table having a suitable chamber and door leading thereto, the bottom of the chamber being provided with an upright pintle; the rack D, consisting of metal rings connected by cross-stays and adapted to rotate upon the said pintle, substantially as shown and described, and for the purpose set forth.

2. In combination with the table having a suitable chamber and door leading thereto, the bottom of the chamber having an upright pintle, the rack D, consisting of hub $d$ and one large metal ring inclosing a number of smaller rings which are adapted for supporting pots and kettles, the said rack being made removable, substantially as shown and described, and for the purpose set forth.

J. W. WOLCOTT.

Witnesses:
  MAUD AMES,
  J. N. RUSSELL.